G. F. THOMPSON.
SWINGLETREE.
APPLICATION FILED AUG. 29, 1908.
944,114.
Patented Dec. 21, 1909.
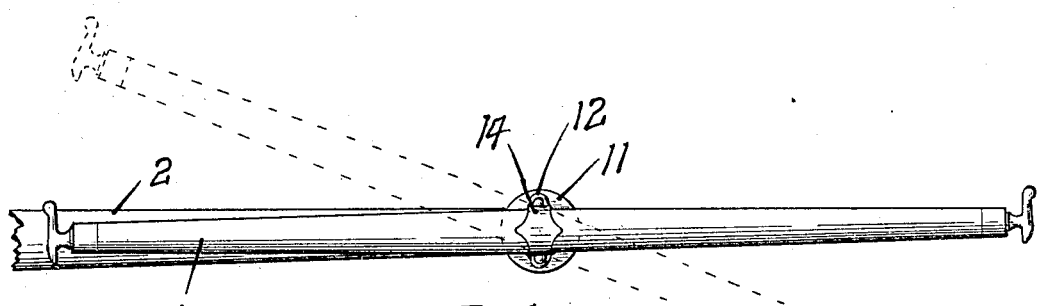
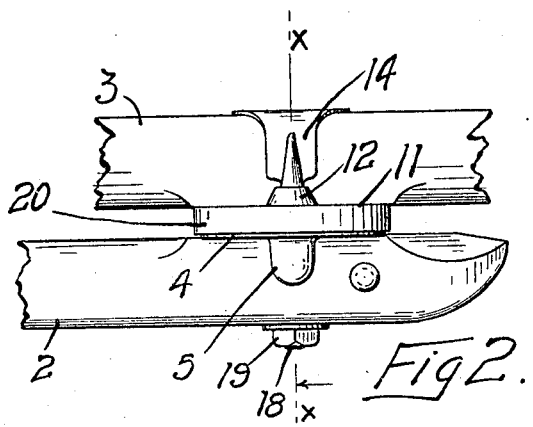
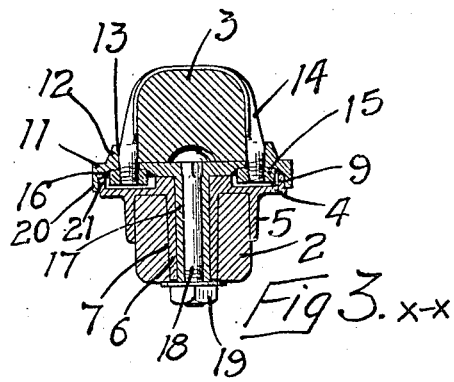
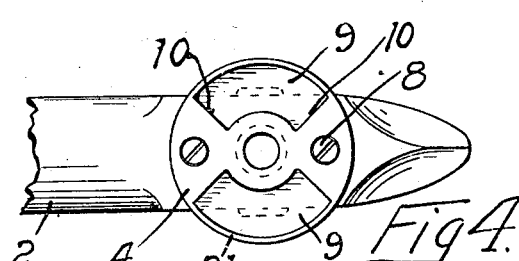
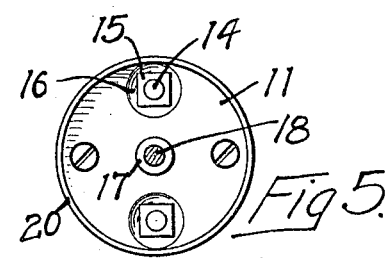
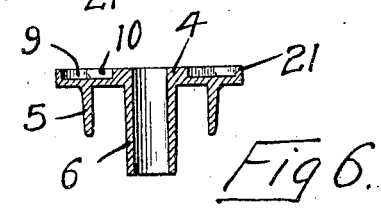
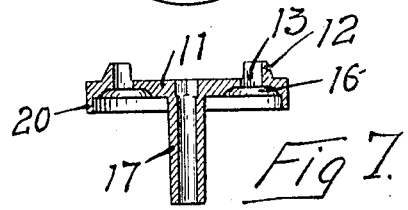
WITNESSES
INVENTOR
GEORGE F. THOMPSON
BY Paul & Paul
HIS ATTORNEYS

UNITED STATES PATENT OFFICE.

GEORGE F. THOMPSON, OF MINNEAPOLIS, MINNESOTA.

SWINGLETREE.

944,114.  Specification of Letters Patent.  Patented Dec. 21, 1909.

Application filed August 29, 1908. Serial No. 450,884.

*To all whom it may concern:*

Be it known that I, GEORGE F. THOMPSON, of Minneapolis, Hennepin county, Minnesota, have invented certain new and useful Improvements in Swingletrees, of which the following is a specification.

My invention relates to the pivot or bearing of a swingle-tree and the object of the invention, is to provide a combined pivot for the swingle-tree and means to prevent the swingle-tree from swinging too far in either direction.

A further object, is to provide a swingle-tree pivot which will prevent the swingle-tree from working loose and tilting or wabbling from side to side.

A further object, is to provide a securing means for the swingle-tree which will dispense with necessity of providing a bolt hole therein.

My invention consists generally in various constructions and combinations, all as hereinafter described, and particularly pointed out in the claims.

In the accompanying drawings forming part of this specification, Figure 1, is a top view of a swingle tree illustrating my invention applied thereto, Fig. 2, is a detail view showing the manner of connecting the swingle tree to the evener, Fig. 3, is a sectional view on the line x—x of Fig. 2, Fig. 4, is a detail view showing the top of the lower casting that is secured to the evener, Fig. 5, is a bottom view of the upper casting, Fig. 6, is a detailed sectional view of the casting that is secured to the evener, and Fig. 7, is a similar view of the swingle-tree casting.

In the drawing, 2 represents an evener, and 3 the swingle-tree.

4 is a plate adapted to fit on the evener and having lugs 5 to extend down on each side of the same. A sleeve 6 is formed on the plate 4, and adapted to fit within a socket 7 in the evener. The plate is secured to the evener by screws 8 or other suitable means and intermediate to said screws is provided with recesses 9 having square shoulders 10 at each end.

A plate 11 is adapted to fit the under side of the swingle-tree and has lugs 12 on each side of the swingle-tree and holes 13 to receive the threaded ends of a clip 14 which extends over the swingle-tree and is provided with nuts 15 which fit within recesses 16 in the plate 11 and also within the recesses 9 as indicated in Fig. 3. These nuts hold the plate 11 securely on the swingle-tree and the square shoulders 10 contacting with the nuts, serve as stops for the swingle-tree and limit its oscillation in either direction, thus doing away with the straps usually employed for this purpose. The plate 4 has a broad bearing surface for the under side of the plate 11 and the plate 11 has a hollow stud 17 that is adapted to fit within the sleeve 6. A carriage bolt 18 is adapted to pass down through the hollow stud 17 and is provided at its lower end with a nut 19 and a washer 19' by means of which the swingle-tree plate is held on the evener plate. The swingle-tree plate also has a depending flange 20 which extends down around an upwardly turned flange 21 formed on the plate 4, these two flanges coöperating with one another to form a dirt and dust proof joint, to prevent the entrance of dust or dirt into the bearing. This coupling will be made of malleable iron, is composed of but few parts, and will form a substantial pivot and stop for the swingle-tree. The bearing surface being broad, there will be no danger of the swingle-tree working loose and tipping from side to side as often happens in swingle-trees as ordinarily mounted.

The device will present a neat appearance on an evener, and the parts are easily accessible for examination or repairs.

I claim as my invention:

1. The combination, with an evener, of a plate fitting thereon and having a sleeve depending within a socket in said evener, means passing down through said plate into said evener and securing them together, a swingle tree, a plate fitting the under side of said swingle tree and having a broad bearing on said evener plate, and means for securing said plates together, a clip passing over said swingle tree and having its ends projecting through holes in said swingle tree plate, nuts provided on the ends of said clip, and said evener plate having recesses therein between the means which secure said plate to said evener, and said recesses extending only partially through said evener plate and being adapted to receive the ends of said clip and the nuts thereon, the ends of said recesses forming stops to engage said nuts and limit the oscillation of said swingle tree, and said swingle tree plate bearing on said evener plate securing means and holding the same in place in said evener, substantially as described.

2. The combination with an evener, of a plate fitting thereon and having a sleeve depending within a socket in said evener, said plate having a raised, flattened bearing surface around the open, upper end of said sleeve, means passing through said bearing surface into said evener and securing said plate on said evener, a plate fitting the under side of a swingle-tree and having a broad, flattened under-surface arranged to bear on the flattened surface of said plate and said swingle-tree plate having a hollow, depending stud fitting within said sleeve and contacting therewith, a bolt having its head located between said swingle-tree plate and the swingle-tree and a shank fitting within said stud and having a nut on its lower end and a clip passing over the swingle tree and having means for securing it to said swingle-tree plate, substantially as described, the ends of said clip being included between said plates and concealed thereby, and said evener plate having means permitting the movement of said clip ends therein and the oscillation of said swingle tree.

3. The combination with an evener, of a plate fitting thereon screws passing through said plate into said evener, a swingle-tree, a plate fitting the under side of said swingle-tree and bearing on said evener plate above said screws and preventing them from working loose in said evener, means for securing said plates together, a clip passing over said swingle-tree and having its ends fitting in holes in said swingle-tree plate, nuts provided on the ends of said clip and said evener plate having recesses between the points where it is secured to said evener to receive said nuts and the ends of said recesses forming stops for limiting the oscillation of said swingle-tree, said recesses being of sufficient length to allow horizontal movement of the nuts and ends of the clip therein and extending only partially through the evener plate, whereby the clip ends and nuts will be entirely concealed.

4. The combination, with an evener, of a plate fitting thereon and having a sleeve depending within a socket in said evener, and lugs depending from said plate on each side of said evener and contacting therewith, means for securing said plate to said evener, and said plate having curved recesses therein between said securing means, a second plate adapted to fit the under side of a swingle tree and having a depending flange that is adapted to inclose said evener plate, said swingle tree plate having a bearing surface on said evener plate above said securing means, and a stud fitting within said sleeve, and a bolt passing through said swingle tree plate and stud and securing said plates together, a clip passing over said swingle tree and having its ends fitting within holes in said swingle tree plate and projecting into the recesses in said evener plate, and said clip having nuts thereon within said recesses, and said nuts engaging the end walls of said recesses and limiting the oscillation of said swingle tree, substantially as described.

5. The combination, with an evener, of a plate fitting thereon and having a sleeve depending within a socket in said evener and extending entirely therethrough, a plate fitting the under side of a swingle tree and having a surface arranged to bear on the upper surface of said evener plate, and said swingle tree plate having a hollow depending stud fitting within said sleeve and contacting therewith and extending to the lower end thereof, a bolt having its head resting upon the top of said swingle tree plate and fitting within said hollow stud and extending below the same and provided with a washer, which contacts with the lower ends of said sleeve and stud, and a lock nut for the lower end of said bolt, the edge of said swingle tree plate forming a close joint with the edge of said evener plate, and means securing said swingle tree plate to a swingle tree, substantially as described.

In witness whereof, I have hereunto set my hand this 20th day of August 1908.

GEORGE F. THOMPSON.

Witnesses:
RICHARD PAUL,
W. E. DRESSLER.